United States Patent [19]
Ljungberg

[11] Patent Number: 5,480,253
[45] Date of Patent: Jan. 2, 1996

[54] DEVICE FOR JOINING BOARD-SHAPED ELEMENTS INTO ONE UNIT

[76] Inventor: Karl-Johan Ljungberg, Esplanaden 5, Fjugesta, Sweden, S-716 31

[21] Appl. No.: 142,324

[22] PCT Filed: May 15, 1992

[86] PCT No.: PCT/SE92/00318

§ 371 Date: Nov. 16, 1993

§ 102(e) Date: Nov. 16, 1993

[87] PCT Pub. No.: WO92/20260

PCT Pub. Date: Nov. 26, 1992

[30] Foreign Application Priority Data

May 16, 1991 [SE] Sweden ............................ 9101489

[51] Int. Cl.$^6$ ................................. F16B 12/20
[52] U.S. Cl. ................... 403/409.1; 403/408.1; 403/405.1; 403/342; 403/389; 312/111
[58] Field of Search ................ 403/409.1, 408.1, 403/407.1, 406.1, 405.1, 391, 389, 342; 312/111, 198

[56] References Cited

U.S. PATENT DOCUMENTS

| 721,292 | 2/1903 | Forster .......................... 312/111 X |
|---|---|---|
| 2,686,699 | 8/1954 | Davis et al. ................... 312/111 X |
| 2,686,700 | 8/1954 | McCarran ....................... 312/111 X |
| 2,702,732 | 2/1955 | McCarran ....................... 312/111 X |
| 2,930,665 | 3/1960 | Budai .............................. 312/111 |
| 4,045,927 | 9/1977 | Diaz ............................. 403/409.1 X |
| 4,405,253 | 9/1983 | Stockum ....................... 403/408.1 X |

FOREIGN PATENT DOCUMENTS

| 0129672 | 1/1985 | European Pat. Off. . |
|---|---|---|
| 0180965 | 5/1986 | European Pat. Off. . |
| 0316242 | 5/1989 | European Pat. Off. . |
| 1148545 | 12/1957 | France . |
| 1456969 | 10/1966 | France . |
| 1574003 | 7/1969 | France ........................... 312/111 |
| 1046282 | 12/1958 | Germany ...................... 403/407.1 |
| 2216248 | 10/1973 | Germany . |
| 319046 | 7/1969 | Sweden . |
| 429470 | 9/1983 | Sweden . |
| 2060118A | 4/1981 | United Kingdom . |
| WO87/02102 | 4/1987 | WIPO . |

Primary Examiner—Eric K. Nicholson
Assistant Examiner—Anthony Knight
Attorney, Agent, or Firm—Jacobson, Price, Holman & Stern

[57] ABSTRACT

Device for joining board-shaped elements into one unit with the board-shaped elements extending in a substantially parallel relationship to each other and internally separated by an intermediate gap, has a coupling list abutting adjacent parallel edge portions of the board-shaped elements with members extending towards and engaging with the edge portions. According to the invention, the coupling list includes at least one tension member extending from the side of the coupling list that abuts the edge portions of the board-shaped elements and the tension member is arranged to engage with at least one tightening element extending between the board-shaped elements which when manually rotated is arranged to impose a tightening force unto the tension member causing the coupling list to be pressed against the edge portions of the board-shaped elements.

6 Claims, 6 Drawing Sheets

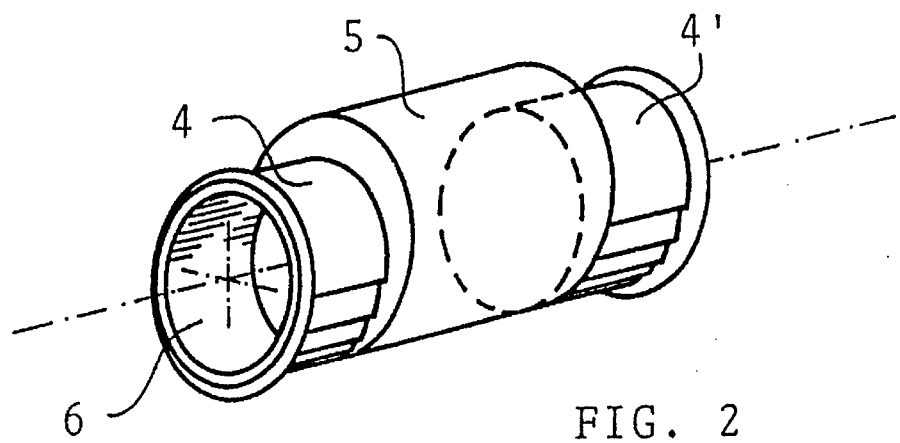
FIG. 2
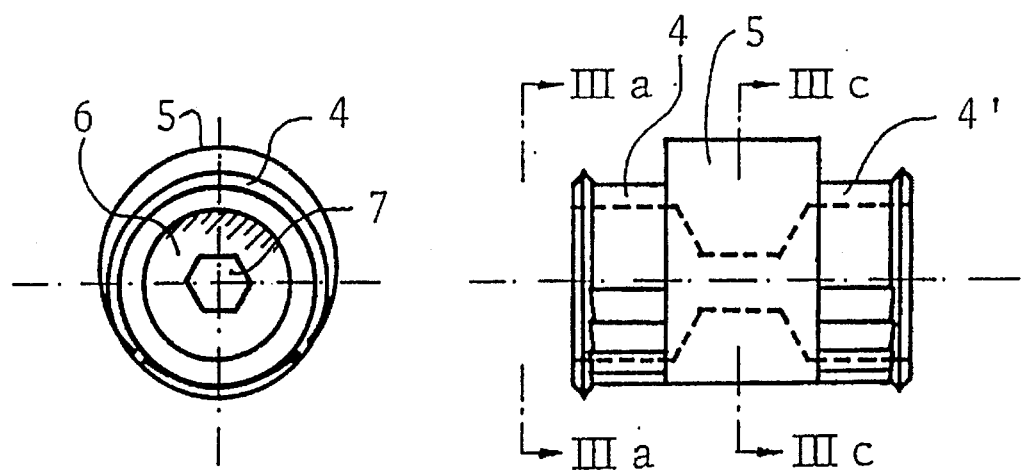
FIG. 3a
FIG. 3b
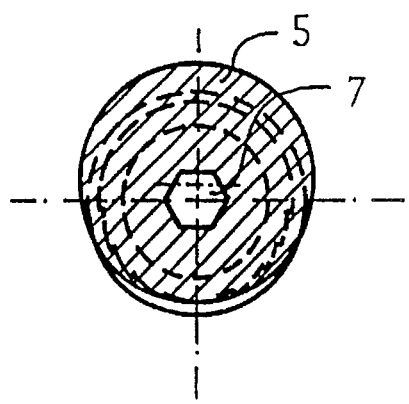
FIG. 3c 5,480,253

DEVICE FOR JOINING BOARD-SHAPED ELEMENTS INTO ONE UNIT

TECHNICAL FIELD

The present invention relates to a device for joining board-shaped elements into one unit with the board-shaped elements extending in a substantially parallel relationship to each other, and being internally separated by an intermediate gap.

TECHNICAL BACKGROUND

With regard to, for example, cupboard sides, screening systems and similar, included units normally comprise of one element only, having respectively side planes and edge surfaces arranged with a protective and/or decorative surface coating. When applying a surface against both sides of the board-shaped elements there is an obvious risk for surface damage, during manufacture as well as during distribution. The board-shaped elements often comprise of a homogeneous material, and when delivered in a disassembled fashion, the products often include many visible coupling fittings. When for example two cupboard units are mounted side by side, decorative surfaces in contact with each other are obviously without any value. Furthermore, any electrical wiring in such units will obviously be visible.

EP-A1-0 316 242 discloses a board-shaped unit, comprising of two board-shaped elements located adjacent to each other, internally joined by means of a surrounding coupling list engaging with the board-shaped elements. A surrounding groove is arranged in one of the board-shaped elements, engaging with a protruding member from the coupling list. The outer side portion of the other board-shaped element is seized by a member protruding from the coupling list, and between the board-shaped elements are elastically deformable separating elements arranged, which cause a separating force which results in that the surrounding coupling list is maintained in position. A further previously known solution utilizing an embracing coupling list is disclosed in DE-A-2 216 248, and includes a coupling list having a substantially U-shaped section, having the outer open portion arranged with the legs separated with a larger distance than at the bottom portion of the section. A stop is thus formed by each leg in conjunction with the change between a larger and a smaller leg separation, whereagainst a board-shaped element, having a width substantially corresponding to the internal width at the outer portion of the section, can be inserted into an abutting position. A screw connection, extending through the section in the area between the stop surfaces and the bottom portion of the section, is used to hold a board-shaped element inserted into the outer portion of the section by means of a squeezing action. GB-A-2 060 118 discloses a device to join profiles demountably by means of an excentric action joining means. A section having T-shaped grooves is used, whereagainst hollow sections having square or rectangular cross-section can be connected by means of a joining means, which extends out from the end portion of a hollow section with a member arranged to engage with a T-shaped groove. A member having excentric action co-acting with the joining means, and being located surrounded by the hollow section, is accessible through a hole taken up by one side of the section, and can be rotated by manual influence, thereby moving the joining means further into the hollow section, thereby pressing same against the section including the aforementioned T-groove.

DISCLOSURE OF THE INVENTION

The object of the present invention is to disclose a device which facilitates joining of two board-shaped elements into one unit, and with an intermediately located gap between the board-shaped elements. In difference to the solution disclosed in EP-A1-0 316 242, no intermediately located elastic elements are required, and furthermore, a safer coupling between the elements is achieved, and it is also possible to join several such units together. A further object of the present invention is to disclose a design, which can be delivered in disassembled fashion, and which can be easily assembled by a non-skilled person using simple tools. Furthermore, non-visible electric wiring in the gap between the board-shaped elements can be easily accomplished.

The device according to the present invention is intended to join board-shaped elements into one unit with the board-shaped elements extending in a substantially parallel relationship to each other and internally separated by means of an intermediate gap, comprising a coupling list abutting adjacent parallel edge portions of the board-shaped elements having means extending towards and engaging with said edge portions, and it is mainly characterized in that the coupling list includes at least one tension member extending from the side of the coupling list that abuts the edge portions of the board-shaped elements, and that said tension member is arranged to engage with at least one tightening means extending between the board-shaped elements, which by means of a manual rotary influence from a tool inserted through a through hole in the board-shaped elements impose a tightening force unto the tension member arranged to press the coupling list against the edge portions of the board-shaped elements.

BRIEF DESCRIPTION OF THE DRAWINGS

A number of examples of embodiments of a device according to the invention will be more fully described below with reference to the accompanying drawings, in which:

FIG. 2 is a perspective view showing the embodiment of a member with eccentric action which is included in the example that is shown in FIG. 1;

FIGS. 3a and 3b are an end view and a side view respectively of the member with eccentric action that is shown in FIG. 2;

FIG. 3c is a cross-sectional view of the central portion of the member with excentric action shown in FIG. 3b;

PREFERRED EMBODIMENTS OF THE INVENTION

Figure 1:
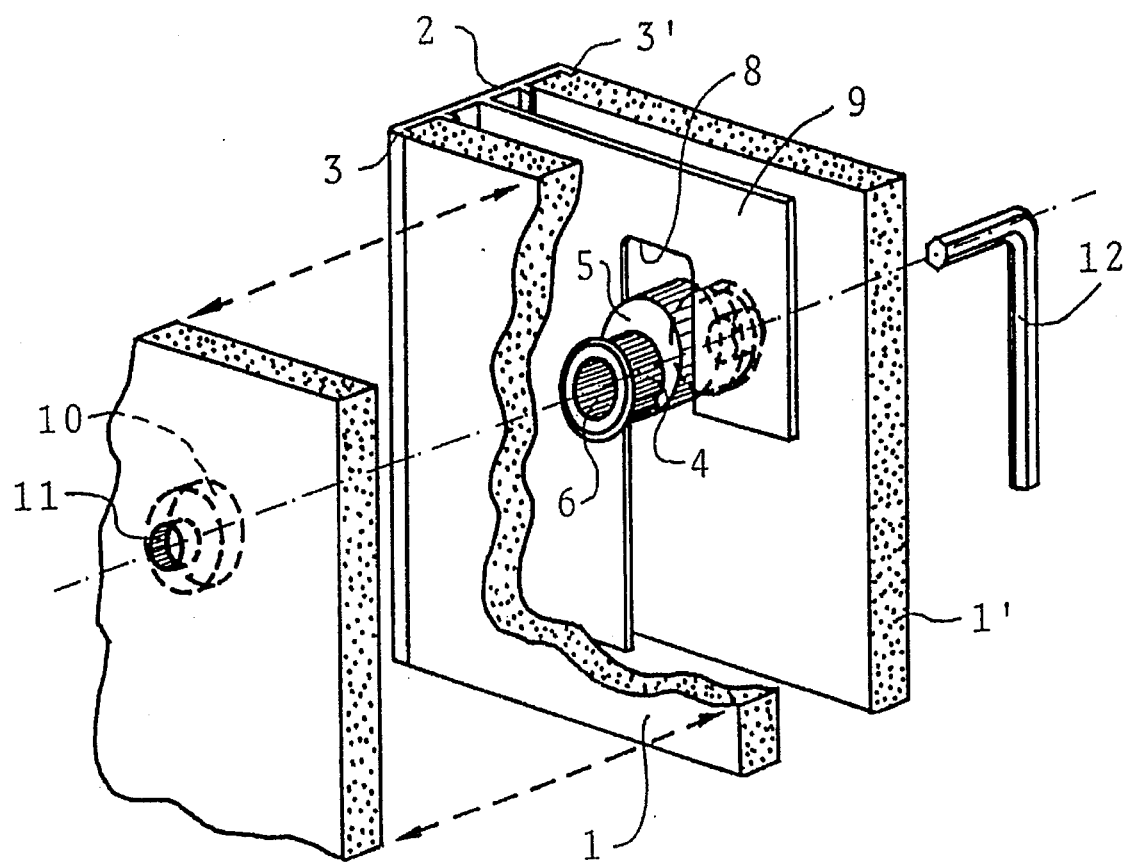
FIG. 1 is a perspective view, partly in cross-section, disclosing a first example of an embodiment according to the invention.

With reference to FIG. 1, two board-shaped elements 1, 1' are shown in a spaced but parallel relationship to each other, and with a coupling list, as a complete unit denominated 2, arranged extending over the edge portions of the board-shaped elements 1, 1' and engaging with same by means of members 3, 3' extending from the outer portions of the coupling list 2 towards the board-shaped elements 1, 1'. In order to make the illustration more clear, a part of one of the board-shaped elements 1 is shown slightly moved away from the remaining part of the element 1. A member with eccentric action is located in an intermediate position to the two board-shaped elements 1, 1' including two outer coaxially located stud-shaped members 4, 4', the outer members 4, 4' central eccentric member 5.

This member with eccentric action is shown more in detail in FIGS. 2–3c, which show that the stud-shaped members 4, 4' advantageously are arranged with an increasing diameter in direction from the central eccentric member 5, and that the external surfaces of the stud-shaped members 4, 4' advantageously include a grooved or sawtooth configuration, as well as that a central through hole 6 is arranged through the member with eccentric action. A central portion 7 of the last mentioned hole 6 is according to this embodiment arranged with a hexagonal configuration, and the hole 6 is arranged having an increasing diameter in direction away from this central portion 7 towards the outer planes of the stud-shaped members 4, 4'.

The above described part is shown in FIG. 1 with the central member with eccentric action 5 located in a slot 8 open in direction downwards, formed in a tension member 9 extending from the coupling list 2, located in an intermediate position in relation to the members 3, 3' extending from the coupling list 2 which engage the board-shaped elements 1, 1'. Furthermore, two borings 10, 10' are arranged in the facing surfaces of the board-shaped elements 1, 1', arranged with a diameter slightly exceeding the external diameter of the stud-shaped members 4, 4'. In at least one of the board-shaped elements 1, 1', said bores 10, 10' continue into a centrally located through hole 11, 11' with a smaller diameter, intended to facilitate insertion of a tool 12 engaging with the central portion 7 of the hole 6, such as a key having hexagonal cross-section, a screwdriver or other engaging tool.

Figure 4:
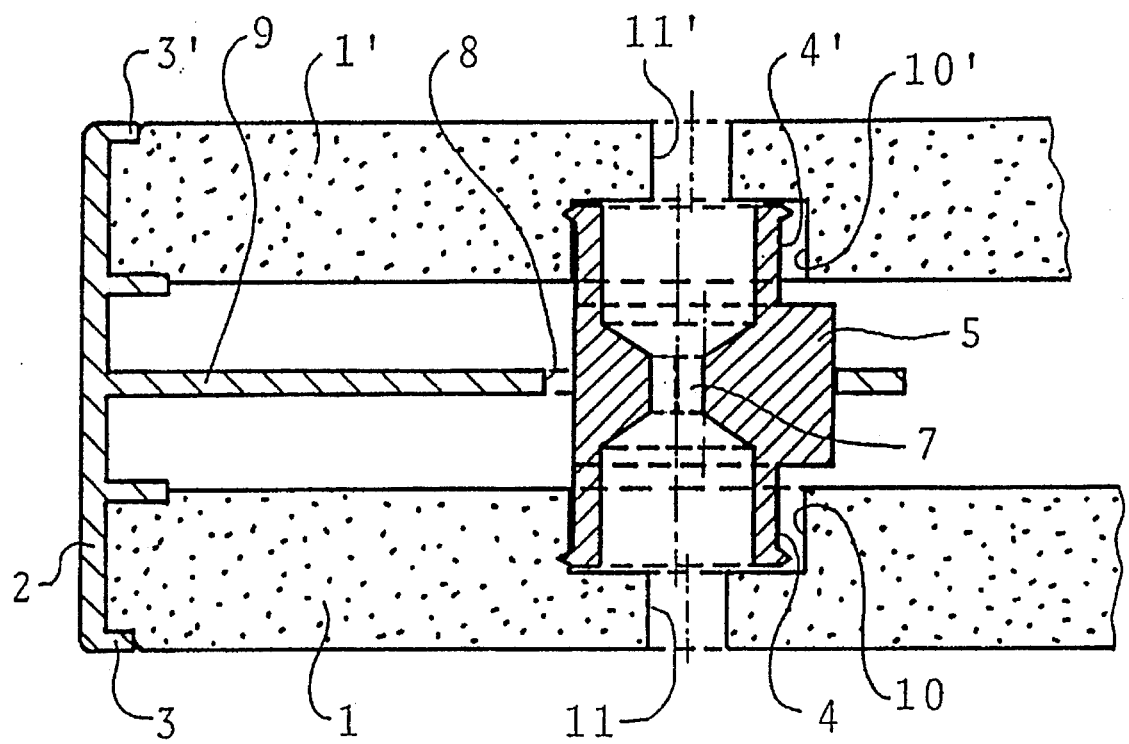
FIG. 4 is a cross-sectional view intended to show how the member with eccentric action shown in FIG. 2 engages two from each other spaced board-shaped elements when mounted/tightened.

During assembly, required number of members with eccentric action 4, 4', 5 are first placed in the bores 10, 10' taken up in the board-shaped elements to be joined, whereafter a coupling list 2 is pressed against the edge portions of the board-shaped elements 1, 1' with the central tension members 9 extending from the coupling list 2 located in such a way that the open portions of the slots 8 are located adjacent to associated eccentric members 5. The coupling list 2 is thereafter moved in such a way, that said eccentric members are located embraced by associated slots 8 (a sliding movement in direction downwards with regard to the embodiment shown in FIG. 1). A tool 12 is thereafter inserted through one of the through holes 11, 11' into engagement with the central portion 7 of the hole 6, whereafter a manual turning movement of the tool 12 results in that the eccentric member 5 forces the coupling list 2 against the edge portions of the board-shaped members 1, 1'. The eccentric member 5 is obviously preferably arranged having a width corresponding to the gap distance between the board-shaped members 1, 1' in assembled position, and thus act as a distance means therebetween. Alternatively, the coupling list 2 can obviously be arranged according to FIG. 4, i.e. with two members 3, 3' extending from the coupling list 2 for each individual board-shaped member 1, 1'. This figure also shows how the stud-shaped members 4, 4' during the tightening operation by means of a cutting action engage with the board-shaped elements 1, 1' adjacent to the bottom portions of the bores 10, 10', and by means of the sawtooth or grooved surface at the stud-shaped members 4, 4' good safety for a locking action is obtained in resulting turned position. As shown in FIG. 1, the width of the coupling list 2 is advantageously arranged corresponding to the distance between the outer planes of the board-shaped elements 1, 1' after assembly, and with grooves taken up by the outer corner portions of the board-shaped elements 1, 1' into which the members 3, 3' extending from the coupling list 2 are located.

The above described example of an embodiment according to the invention can obviously be modified in a number of ways, and a number of examples relating to such modifications will now be briefly described.

Figure 5:
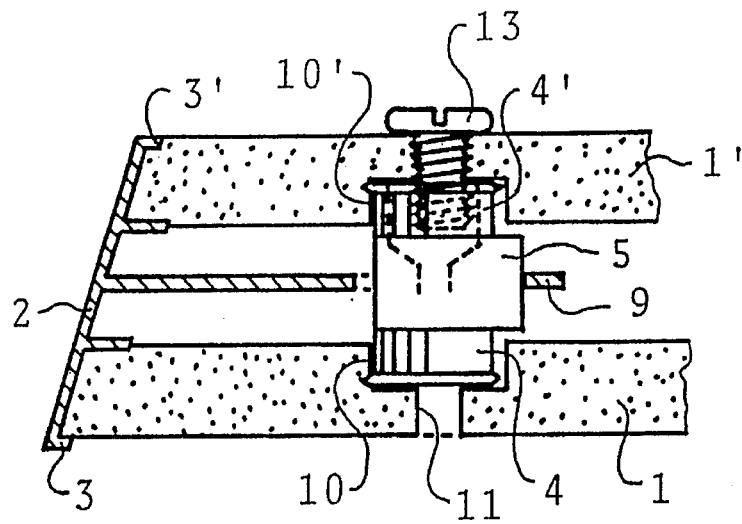
FIG. 5 is a cross-sectional view showing a second embodiment according to the invention.

FIG. 5 shows how the coupling list 2 can be arranged to accomplish an inclined edge surface at a unit formed by two spaced board-shaped elements 1, 1', and also how the through holes 11, 11' after assembly can be used for attachment of, for example, a system screw 13 or other means. The holes 11, 11' consist advantageously of such holes which normally are used for attachment of shelves or similar, and which for example are taken up internally in cupboard walls as equally from each other spaced rows of holes. The intended use of such holes is thus not prevented even if same also serve as insertion holes for a tool 12 during assembly of the units.

Figure 6A:
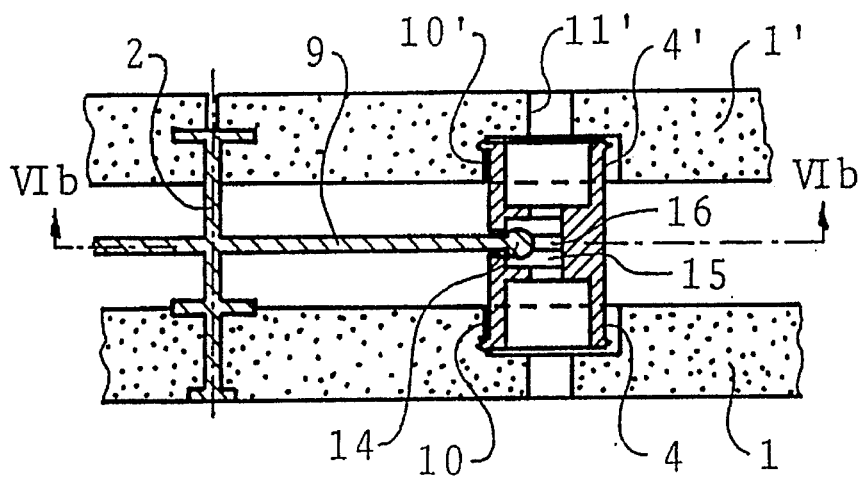
FIGS. 6a and 6b are a view in cross-section and a central view in longitudinal section respectively, showing a third embodiment according to the invention.
Figure 6B:
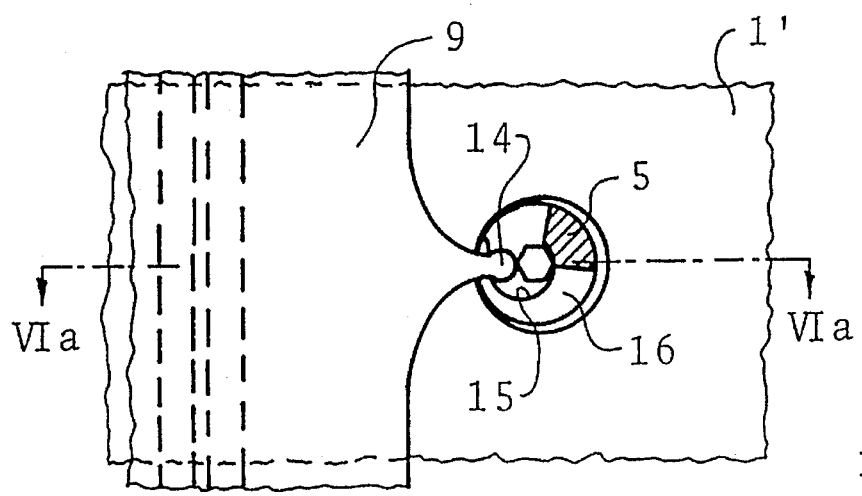

FIGS. 6a and 6b show a modified member with eccentric action, and also a further modified coupling list 2. The slot 8 in the central tension member 9 extending from the coupling list 2 has been replaced by a ball-shaped member 14, and the central member 5 comprises of a substantially cylindrical member, extending coaxially in relationship to the stud-shaped members 4, 4'. An eccentric member 15 has been arranged in the central member 5, with a centrally located through slot 16. As shown in FIG. 6b, the through slot 16 facilitates that the entire means is rotated, without restriction from the central tension member 9 extending from the coupling list, while the eccentric member 15 engages with the ball-shaped member 14, and thus accomplishes desired engagement force for the coupling list 2 when the means is given a turning movement. The coupling list 2 is further shown arranged as a joining member, and facilitates thus connection of four board-shaped elements 1, 1'. It is further shown how the coupling list 2 can be arranged hidden against viewing in connection to the joint accomplished by the rear board-shaped elements 1'.

Figure 7A:
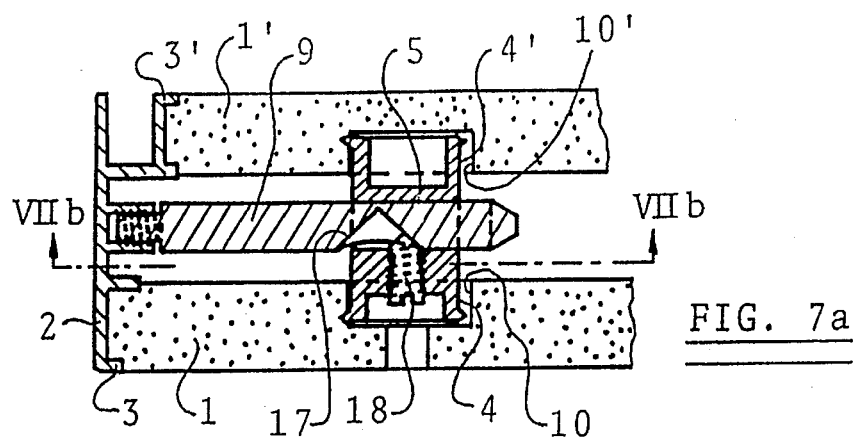
FIGS. 7a and 7b are views corresponding to FIGS. 6a and 6b, showing a fourth embodiment according to the invention.
Figure 7B:
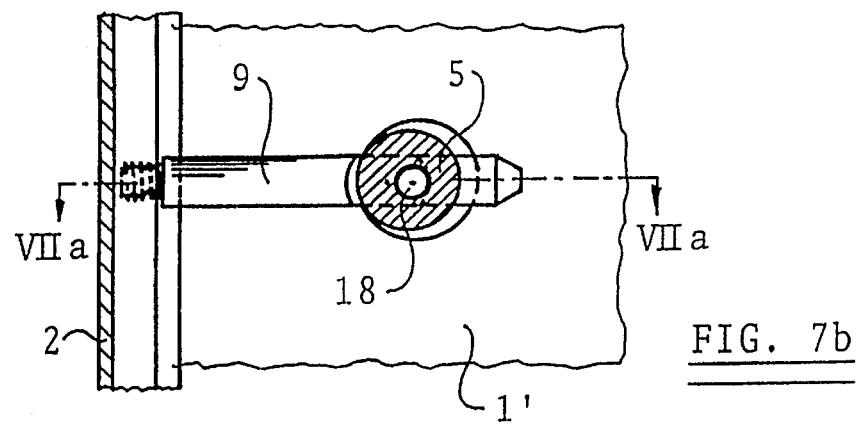

A further example of how required attachment force can be accomplished for the coupling list 2 is shown in FIGS. 7a and 7b, and it is also shown how the coupling list 2 can be further modified. The coupling list 2 is now arranged with a threaded hole, in which a substantially cylindrical tension member 9 is attached, which replaces previously described tension member 9 extending from the coupling list 2. This substantially cylindrical tension member 9 extends through a hole arranged in a cylindrical member 5 located in an intermediate position to the studs 4, 4' and said intermediate member 5 can be arranged coaxial to the studs 4, 4'. A portion 17 of the substantially cylindrical tension member 9 is shown removed, forming an inclined surface relative to the longitudinal axis, whereagainst a screw 18 having a conical first end portion can take up contact. By screwing the screw 18 towards said inclined surface, the substantially cylindrical tension member 9 is moved axially in such a way that the coupling list is pressed against the board-shaped elements 1, 1'. Such an inclined surface can obviously also be arranged surrounding the substantially cylindrical tension member 9, e.g. formed by means of a turning machining operation. The coupling list 2 is further shown arranged in such a way, that an additional board-shaped member can be attached in a substantially transverse relationship to the parallel board-shaped elements 1, 1' shown.

Figure 8:
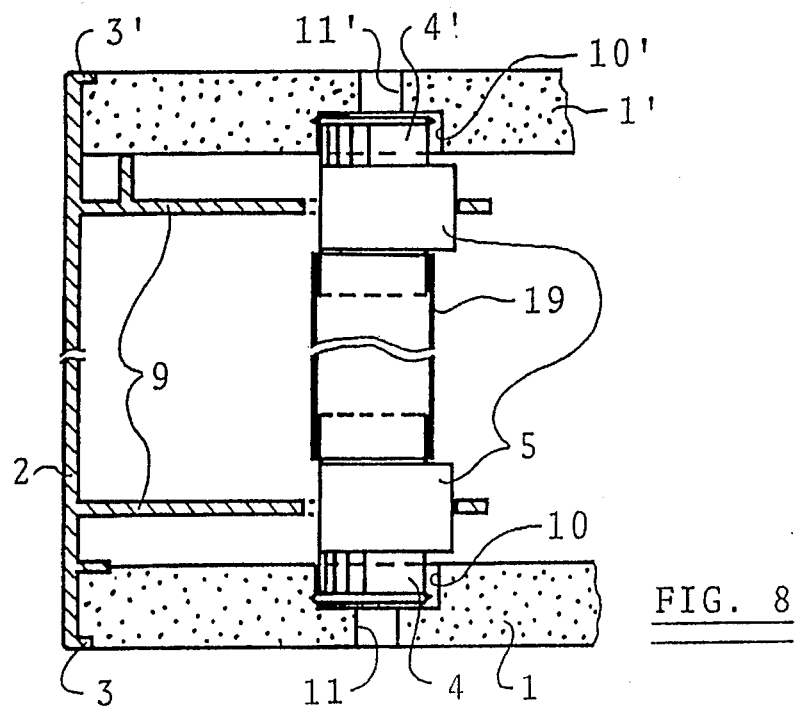
FIG. 8 is a view in cross-section showing a fifth embodiment according to the invention.

In those cases when the board-shaped elements 1, 1' should be attached at a larger distance from each other, e.g. to create a screening wall or similar, FIG. 8 shows an example of a suitable embodiment. In difference to the embodiment described with reference to FIG. 1, two tension members 9 extend from the coupling list 2 in adjacent relationship to each board-shaped member 1, 1'. These can for example advantageously be arranged with slots 8 of the type previously described. Furthermore, two means with eccentric action of the type described with reference to FIG. 1 are used, which are internally joined by means of a distance bushing 19. This embodiment makes it possible to form a rigid element having a large distance between the board-shaped elements 1, 1'.

Figure 9:
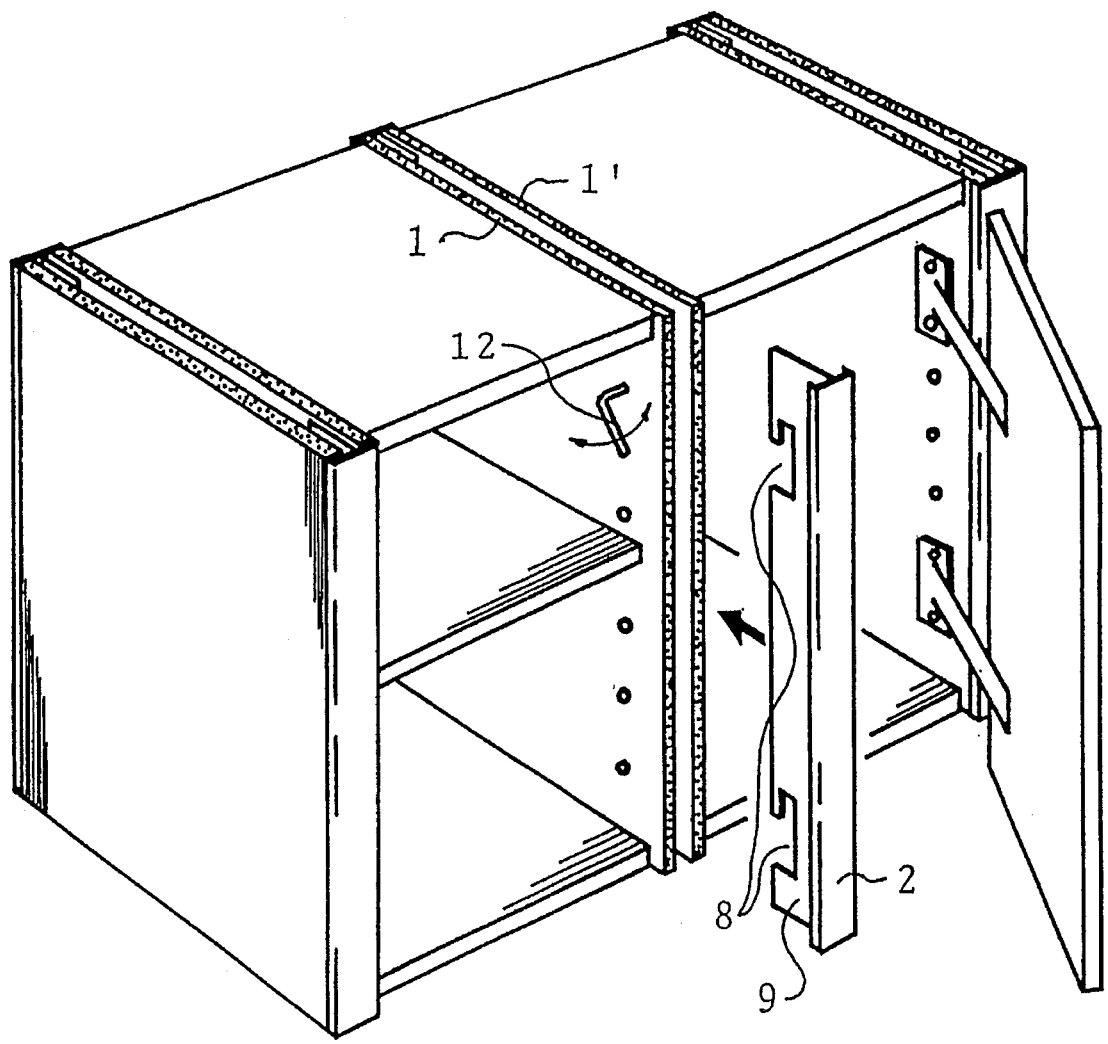
FIG. 9 is a perspective view showing an example of how a kitchen cupboard or similar can be built up according to the invention.

In order to exemplify how the device according to the present invention can be used, FIG. 9 shows a partly assembled cupboard combination, showing a coupling list 2 prior to the mounting of same between two board-shaped elements 1, 1'. This embodiment utilizes the example of an embodiment which has been described with reference to FIG. 1.

The above described examples of embodiments according to the invention can obviously be further modified or combined, without departing from the essential inventive thought. In particular, the coupling list 2 may be further modified in numerous ways, in order to meet desired requirements. Same can, for example, be arranged to join elements in desired angular relationships, e.g. to form corner connections between two elements. The coupling list 2 can further be arranged with various types of decorative shapes or coatings, and same can also be arranged with slots for various functions. As shown, required application force for the coupling list can also be accomplished in a large number of ways, as well as means for required distance keeping between assembled board-shaped elements 1, 1'.

The present invention is thus in no way restricted to the embodiments shown and described, since it can be further modified within the scope of the inventive thought and the following claims.

I claim:

1. Device for joining board-shaped elements into one unit with the board-shaped elements extending in a substantially parallel relationship to each other and internally separated by means of an intermediate gap, comprising a coupling list having a side abutting adjacent parallel edge portions of the board-shaped elements, further having means extending towards and engaging with said edge portions, at least one tension member extending from said side of the coupling list between the board-shaped elements and a rotatable means engaged with the tension member for applying a tightening force to the tension member by means of a manual tool inserted through a hole in one of the board-shaped elements to press the coupling list against the edge portions of the board-shaped elements, characterized in that the tightening means include two outer stud-shaped members with an intermediately located central member, and that the stud-shaped members have an increased cross-sectional configuration in direction away from the central member, thereby forming a surrounding cutting edge portion adjacent to the outer end portions of the stud-shaped members, and that said stud-shaped members are located in bores in facing surfaces of the board-shaped elements.

2. Device according to claim 1, characterized in that the stud-shaped members are each provided with an external surface having a sawtooth or grooved configuration.

3. Device according to claim 1 characterized in that the tightening means has a through hole with a central portion formed as an engagement member for a tool, and that the through hole in a direction away from the central portion is arranged with a larger or increasing diameter.

4. Device according to claim 1, characterized in that the intermediately located central member is arranged as an eccentric member in relation to the stud-shaped members, and that the tension member is arranged with a slot into which the intermediately located central member is insertable, said slot having such an extension that a turning movement in alternative rotary directions of the intermediately located central member in a position embraced by the slot causes the tension member to alternatively press/retract the coupling list in relation to the edge portions of the board-shaped elements.

5. Device according to claim 1, characterized in that the intermediately located central member is arranged with a semi-through groove through which the outer portion of the tension member extends, and which facilitates a restricted rotary movement of the intermediately located central member, and that a rotary center for the stud-shaped members eccentrically extending groove is arranged by the semi-through groove to form a contact surface for a headed member located at the free end portion of the tension member.

6. Device according to claim 1, characterized in that the coupling list is joined to at least one substantially cylindrical tension member, that the intermediately located central member is arranged with a through hole through which the outer portion of the substantially cylindrical tension member extends, and that a pointed screw is arranged in a threaded through hole extending transversely relative to the extension direction for the tension member, co-acting with an inclined surface formed by a portion removed from the tension member, whereby a rotary movement of the pointed screw results in a movement in a direction towards the tension member in cooperation with the inclined surface thus arranged to cause a displacement movement of the tension member resulting in a movement of the coupling list to a forced contact position against the edge portions of the board-shaped members.

* * * * *